United States Patent
Gao

(10) Patent No.: US 9,520,139 B2
(45) Date of Patent: Dec. 13, 2016

(54) POST TONE SUPPRESSION FOR SPEECH ENHANCEMENT

(71) Applicant: Yang Gao, Mission Viejo, CA (US)

(72) Inventor: Yang Gao, Mission Viejo, CA (US)

(*) Notice: Subject to any disclaimer, the term of this patent is extended or adjusted under 35 U.S.C. 154(b) by 23 days.

(21) Appl. No.: 14/740,735

(22) Filed: Jun. 16, 2015

(65) Prior Publication Data

US 2015/0371659 A1 Dec. 24, 2015

Related U.S. Application Data

(60) Provisional application No. 62/014,365, filed on Jun. 19, 2014.

(51) Int. Cl.

| | | |
|---|---|---|
| *G10L 21/02* | (2013.01) | |
| *G10L 21/0208* | (2013.01) | |
| *H04M 9/08* | (2006.01) | |
| *G10L 25/12* | (2013.01) | |
| *G10L 25/90* | (2013.01) | |
| *G10L 21/0264* | (2013.01) | |
| *G10L 21/0232* | (2013.01) | |

(52) U.S. Cl.
CPC .......... *G10L 21/0208* (2013.01); *H04M 9/082* (2013.01); *G10L 21/0232* (2013.01); *G10L 21/0264* (2013.01); *G10L 25/12* (2013.01); *G10L 25/90* (2013.01); *G10L 2021/02082* (2013.01)

(58) Field of Classification Search
CPC ............. G10L 21/0208; G10L 21/0232; G10L 19/012; G10L 2021/02082; H04M 9/082
USPC ........................ 704/226; 379/406.1; 375/350
See application file for complete search history.

(56) References Cited

U.S. PATENT DOCUMENTS

2005/0018796 A1* 1/2005 Sande ................ H03H 17/0266
375/350
2015/0003606 A1* 1/2015 Nemer ................... H04M 9/082
379/406.01

* cited by examiner

*Primary Examiner* — Charlotte M Baker

(57) ABSTRACT

A method for reducing disturbing tone signals from acoustic echoes or background noises in speech/audio signal enhancement processing comprises decomposing a full-band input microphone speech signal into plurality of sub-band component channel signals by using a filter-bank; disturbing tone signal in each sub-band component channel signal is detected by using parameters such as a second reflection coefficient from LPC analysis, a time domain sharpness parameter, a normalized pitch correlation, and/or a SNR parameter; the energy of the current sub-band component channel signal is reduced by multiplying a reduction gain if the disturbing tone signal is detected in the current sub-band component channel signal; all the component channel signals are summed back to output a tone-reduced full band speech signal.

14 Claims, 12 Drawing Sheets

(Pre-Art)

(Pre-Art)

(Pre-Art)

(Pre-Art)

(Pre-Art)

(Pre-Art)

POST TONE SUPPRESSION FOR SPEECH ENHANCEMENT

This application claims the benefit of U.S. Provisional Application No. 62/014,365 filed on Jun. 19, 2014, entitled "Post Tone Suppression for Speech Enhancement," U.S. Provisional Application No. 62/014,359 filed on Jun. 19, 2014, entitled "Control of Acoustic Echo Canceller Adaptive Filter for Speech Enhancement," U.S. Provisional Application No. 62/014,355 filed on Jun. 19, 2014, entitled "Energy Adjustment of Acoustic Echo Replica Signal for Speech Enhancement," U.S. Provisional Application No. 62/014,346 filed on Jun. 19, 2014, entitled "Acoustic Echo Preprocessing for Speech Enhancement," which application is hereby incorporated herein by reference.

TECHNICAL FIELD

The present invention is generally in the field of Echo Cancellation/Speech Enhancement. In particular, the present invention is used to reduce undesired tone component signals.

BACKGROUND

For audio signal acquisition human/machine interfaces, especially in hands-free condition, adaptive beamforming microphone arrays have been widely employed for enhancing a desired signal while suppressing interference and noise. For full-duplex communication systems, not only interference and noise corrupt the desired signal, but also acoustic echoes originating from loudspeakers. For suppressing acoustic echoes, acoustic echo cancellers (AECs) using adaptive filters may be the optimum choice since they exploit the reference information provided by the loudspeaker signals.

To simultaneously suppress interferences and acoustic echoes, it is thus desirable to combine acoustic echo cancellation with adaptive beamforming in the acoustic human/machine interface. To achieve optimum performance, synergies between the AECs and the beamformer should be exploited while the computational complexity should be kept moderate. When designing such a joint acoustic echo cancellation and beamforming system, it proves necessary to consider especially the time-variance of the acoustic echo path, the background noise level, and the reverberation time of the acoustic environment. To combine acoustic echo cancellation with beamforming, various strategies were studied in the public literatures, reaching from cascades of AECs and beamformers to integrated solutions. These combinations address aspects such as maximization of the echo and noise suppression for slowly time-varying echo paths and high echo-to-interference ratios (EIRs), strongly time-varying echo paths, and low EIRs, or minimization of the computational complexity.

For full-duplex hands-free acoustic human/machine interfaces, often a combination of acoustic echo cancellation and speech enhancement is required to suppress acoustic echoes, local interference, and noise. However, efficient solutions for situations with high level background noise, with time-varying echo paths, with long echo reverberation time, and frequent double talk, are still a challenging research topic. To optimally exploit positive synergies between acoustic echo cancellation and speech enhancement, adaptive beamforming and acoustic echo cancellation may be jointly optimized. The adaptive beamforming system itself is already quite complex for most consumer oriented applications; the system of jointly optimizing the adaptive beamforming and the acoustic echo canceller could be too complex.

An 'AEC first' system or 'beamforming first' system which has lower complexity than the system of jointly optimizing the adaptive beamforming and the acoustic echo canceller. In the 'AEC first' system, positive synergies for the adaptive beamforming can be exploited after convergence of the AECs: the acoustic echoes are efficiently suppressed by the AECs, and the adaptive beamformer does not depend on the echo signals. One AEC is necessary for each microphone channel so that multiple complexity is required for multiple microphones at least for filtering and filter update in comparison to an AEC for a single microphone. Moreover, in the presence of strong interference and noise, the adaptation of AECs must be slowed down or even stopped in order to avoid instabilities of the adaptive filters. Alternatively, the AEC can be placed behind the adaptive beamformer in the 'beamforming first' system; the complexity is reduced to that of AEC for a single microphone. However, positive synergies can not be exploited for the adaptive beamformer since the beamformer sees not only interferences but also acoustic echoes.

Beamforming is a technique which extracts the desired signal contaminated by interference based on directivity, i.e., spatial signal selectivity. This extraction is performed by processing the signals obtained by multiple sensors such as microphones located at different positions in the space. The principle of beamforming has been known for a long time. Because of the vast amount of necessary signal processing, most research and development effort has been focused on geological investigations and sonar, which can afford a high cost. With the advent of LSI technology, the required amount of signal processing has become relatively small. As a result, a variety of research projects where acoustic beamforming is applied to consumer-oriented applications such as cellular phone speech enhancement, have been carried out. Applications of beamforming include microphone arrays for speech enhancement. The goal of speech enhancement is to remove undesirable signals such as noise and reverberation. Amount research areas in the field of speech enhancement are teleconferencing, hands-free telephones, hearing aids, speech recognition, intelligibility improvement, and acoustic measurement.

The signal played back by the loudspeaker is fed back to the microphones, where the signals appear as acoustic echoes. With the assumption that the amplifiers and the transducers are linear, a linear model is commonly used for the echo paths between the loudspeaker signal and the microphone signals. To cancel the acoustic echoes in the microphone channel, an adaptive filter is placed in parallel to the echo paths between the loudspeaker signal and the microphone signal with the loudspeaker signal as a reference. The adaptive filter forms replicas of the echo paths such that the output signal of the adaptive filter are replicas of the acoustic echoes. Subtracting the output signal of the adaptive filter from the microphone signal thus suppresses the acoustic echoes. Acoustic echo cancellation is then a system identification problem, where the echo paths are usually identified by adaptive linear filtering. The design of the adaptation algorithm of the adaptive filter requires consideration of the nature of the echo paths and of the echo signals.

SUMMARY

In accordance with an embodiment of the present invention, a method for reducing disturbing tone signals from acoustic echoes or background noises in speech/audio signal enhancement processing comprises decomposing a full-band input microphone speech signal into plurality of sub-band component channel signals by using a filter-bank; disturbing tone signal in each sub-band component channel signal is detected by using parameters such as a second reflection coefficient from LPC analysis, a time domain sharpness parameter, a normalized pitch correlation, and/or a SNR parameter; the energy of the current sub-band component channel signal is reduced by multiplying a reduction gain if the disturbing tone signal is detected in the current sub-band component channel signal; all the component channel signals are summed back to output a tone-reduced full band speech signal.

In an alternative embodiment, a speech signal enhancement processing apparatus comprises a processor, and a computer readable storage medium storing programming for execution by the processor. The programming include instructions to decompose a full-band input microphone speech signal into plurality of sub-band component channel signals by using a filter-bank; disturbing tone signal in each sub-band component channel signal is detected by using parameters such as a second reflection coefficient from LPC analysis, a time domain sharpness parameter, a normalized pitch correlation, and/or a SNR parameter; the energy of the current sub-band component channel signal is reduced by multiplying a reduction gain if the disturbing tone signal is detected in the current sub-band component channel signal; all the component channel signals are summed back to output a tone-reduced full band speech signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
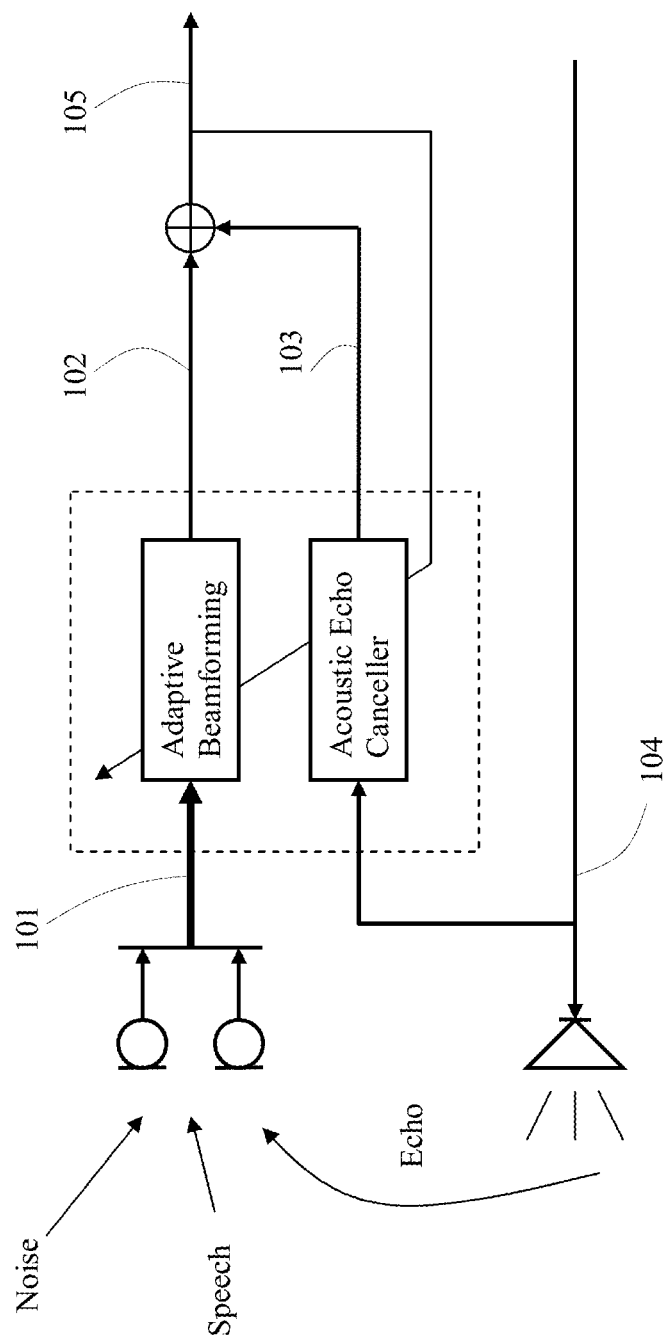
FIG. 1 illustrates a joint optimization of Adaptive Beamforming and Acoustic Echo Cancellation (AEC).

To optimally exploit positive synergies between acoustic echo cancellation and speech enhancement, adaptive beamforming and acoustic echo cancellation may be jointly optimized as shown in FIG. 1. 101 are input signals from an array of microphones; 102 is a noise reduced signal output from adaptive beamforming system; the signal 104 outputs to the speaker, which is used as a reference signal of the echo canceller to produce an echo replica signal 103; the signal 102 and the signal 103 are combined to produce an optimal output signal 105 by jointly optimizing the adaptive beamforming and the acoustic echo canceller. The adaptive beamforming system itself is already quite complex for most consumer oriented applications; the FIG. 1 system of jointly optimizing the adaptive beamforming and the acoustic echo canceller could be too complex, although the FIG. 1 system can theoretically show its advantage for high levels of background noise, time-varying echo paths, long echo reverberation time, and frequent double talk.

Figure 2:
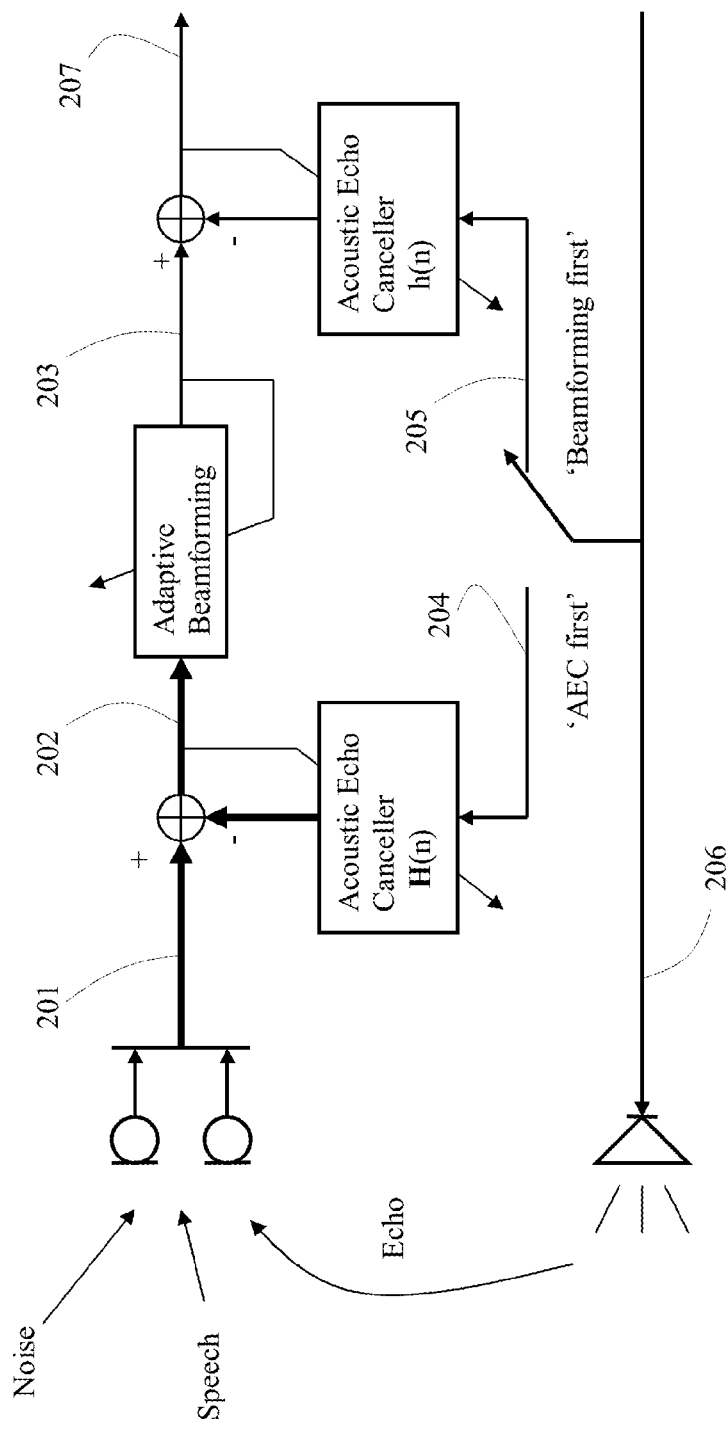
FIG. 2 illustrates a combination of AEC and Beamforming.

FIG. 2 shows an 'AEC first' system or 'beamforming first' system which has lower complexity than the system of FIG. 1. In the 'AEC first' system, a matrix H(n) directly models the echo paths between the speaker and all microphones without interaction with the adaptive beamforming. For the adaptive beamforming, positive synergies can be exploited after convergence of the AECs: the acoustic echoes are efficiently suppressed by the AECs, and the adaptive beamformer does not depend on the echo signals. One AEC is necessary for each microphone channel so that multiple complexity is required for multiple microphones at least for filtering and filter update in comparison to an AEC for a single microphone. Moreover, in the presence of strong interference and noise, the adaptation of AECs must be slowed down or even stopped in order to avoid instabilities of the adaptive filters H(n). Alternatively, the AEC can be placed behind the adaptive beamformer in the 'beamforming first' system; the complexity is reduced to that of AEC for a single microphone. However, positive synergies can not be exploited for the adaptive beamformer since the beamformer sees not only interferences but also acoustic echoes. 201 are input signals from an array of microphones; for the 'AEC first' system, echoes in each component signal of 201 need to be suppressed to get an array of signals 202 inputting to the adaptive beamforming system; the speaker output signal 206 is used as a reference signal 204 of echo cancellation for the 'AEC first' system or as a reference signal 205 of echo cancellation for the 'beamforming first' system. In the 'beamforming first' system, echoes only in one signal 203 output from the adaptive beamforming system need to be cancelled to get final output signal 207 in which both echoes and background noise have been suppressed or reduced. As the single adaptation of the echo canceller response h(n) in the 'beamforming first' system has much lower complexity than the matrix adaptation of the echo canceller response H(n) in the 'AEC first' system, obviously the 'beamforming first' system has lower complexity than the 'AEC first' system.

Beamforming can be considered as multi-dimensional signal processing in space and time. Ideal conditions assumed in most theoretical discussions are not always maintained. The target DOA (direction of arrival), which is assumed to be stable, does change with the movement of the speaker. The sensor gains, which are assumed uniform, exhibit significant distribution. As a result, the performance obtained by beamforming may not be as good as expected. Therefore, robustness against steering-vector errors caused by these array imperfections are become more and more important.

Figure 3:
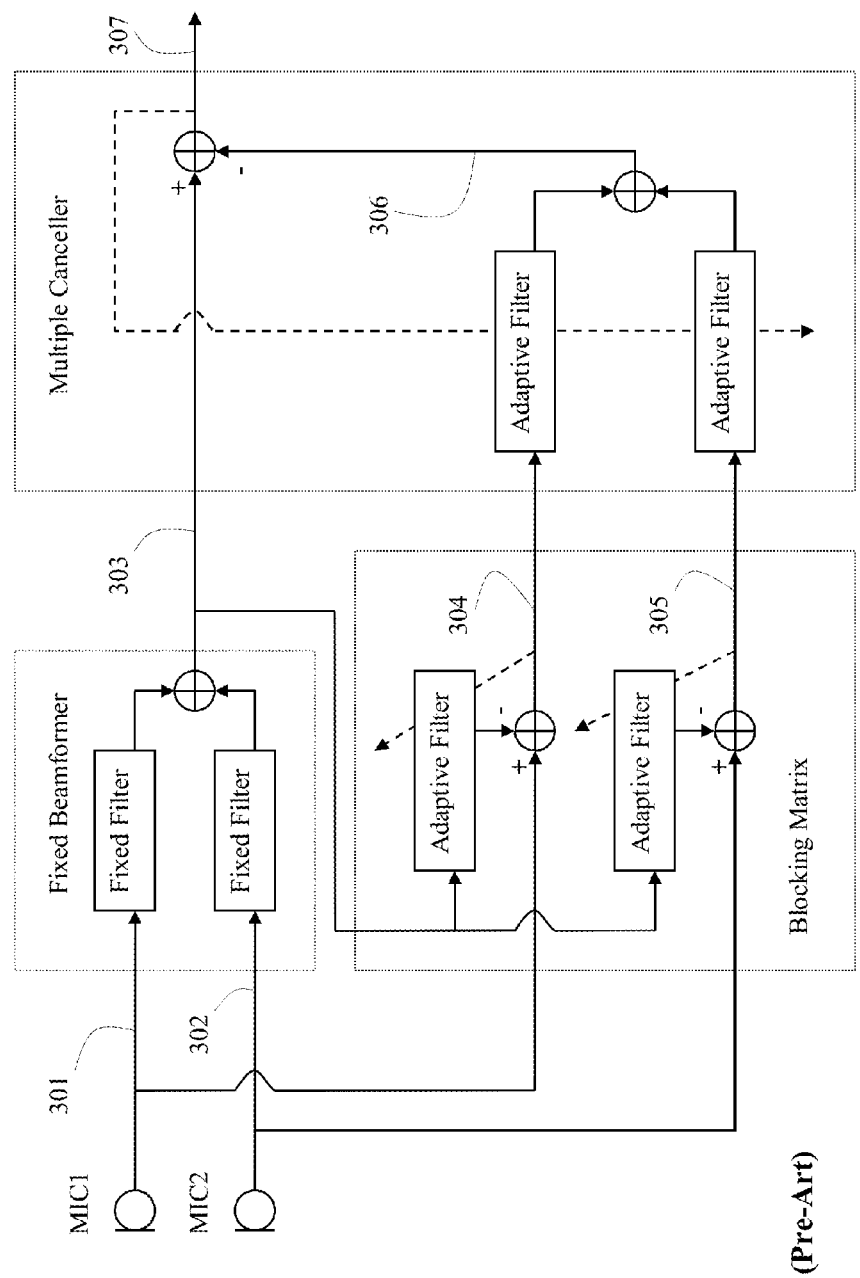
FIG. 3 illustrates a traditional Beamformer/Noise Canceller.

A beamformer which adaptively forms its directivity pattern is called an adaptive beamformer. It simultaneously performs beam steering and null steering. In most traditional acoustic beamformers, however, only null steering is performed with an assumption that the target DOA is known a priori. Due to adaptive processing, deep nulls can be developed. Adaptive beamformers naturally exhibit higher interference suppression capability than its fixed counterpart. FIG. 3 depicts a structure of a widely known adaptive beamformer among various adaptive beamformers. Microphone array could contain multiple microphones; for the simplicity, FIG. 3 only shows two microphones.

FIG. 3 comprises a fixed beamformer (FBF), a multiple input canceller (MC), and blocking matrix (BM). The FBF is designed to form a beam in the look direction so that the target signal is passed and all other signals are attenuated. On the contrary, the BM forms a null in the look direction so that the target signal is suppressed and all other signals are passed through. The inputs 301 and 302 of FBF are signals coming from MICs. 303 is the output target signal of FBF. 301, 302 and 303 are also used as inputs of BM. The MC is composed of multiple adaptive filters each of which is driven by a BM output. The BM outputs 304 and 305 contain all the signal components except that in the look direction. Based on these signals, the adaptive filters generate replicas 306 of components correlated with the interferences. All the replicas are subtracted from a delayed output signal of the fixed beamformer which has an enhanced target signal component. In the subtracted output 307, the target signal is enhanced and undesirable signals such as ambient noise and interferences are suppressed.

Figure 4:
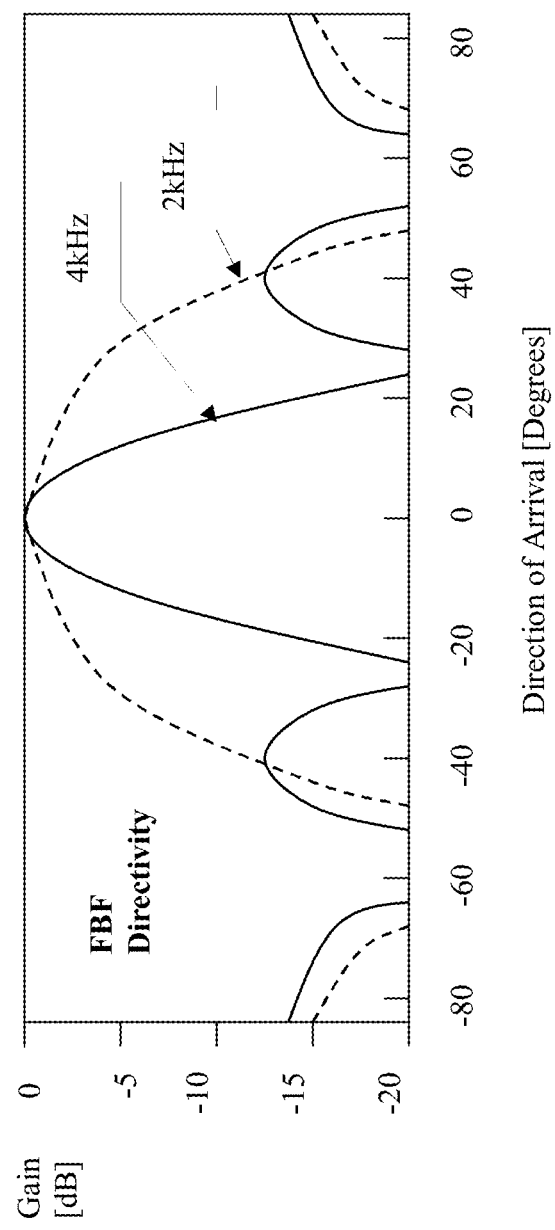
FIG. 4 illustrates a directivity of Fixed Beamformer.
Figure 5:
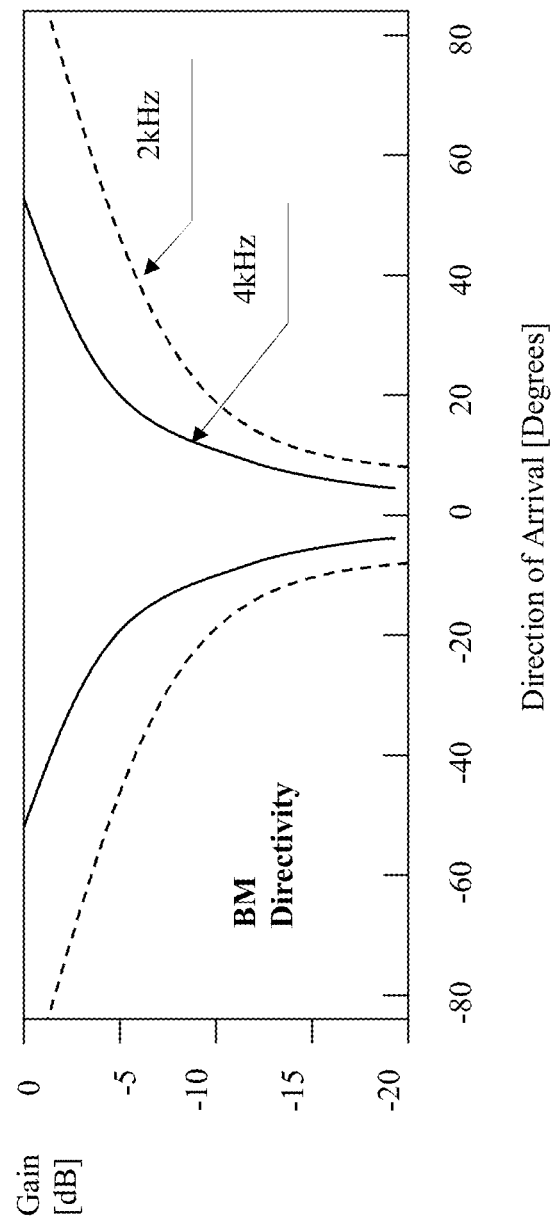
FIG. 5 illustrates a directivity of Block Matrix.

FIG. 4 shows an example of directivity of the FBF. FIG. 5 shows an example of directivity of the BM. In real applications, the system FIG. 3 can be simplified and made more efficient, the details of which are out of scope of this specification and will not be discussed here.

The acoustic echo paths may vary strongly over time due to moving sources or changes in the acoustic environment requiring a good tracking performance of the adaptation algorithm. The reverberation time of the acoustic environment typically ranges from, e.g., T≈50 ms in passenger cabins of vehicles to T>1 s in public halls. With the theoretical length estimation of the adaptive filter order $N_h$ $$N_h \approx \frac{ERLE}{60} \cdot f_s \cdot T,$$

where ERLE is the desired echo suppression of the AEC in dB; as a rule of thumb it becomes obvious that with many realistic acoustic environment and sampling rates $f_s$=4-48 kHz, adaptive FIR filters with several thousands coefficients are needed to achieve ERLE≈20 dB. Obviously, too long adaptive filter order is not practical not only in the sense of the complexity but also of the convergence time. For environments with long reverberation times, this means that the time for convergence—even for fast converging adaptation algorithms—cannot be neglected and that, after a change of echo paths, noticeable residual echoes may be present until the adaptation algorithm is re-converged.

As mentioned above, the echo reverberation time mainly depends on the location of the loudspeaker and the microphones, ranging from, e.g., T≈50 ms in passenger cabins of vehicles to T>1 s in public halls. When the case of long echo reverberation time happens, one way to keep the efficiency of the echo cancellation is to increase the order of the adaptive filter; however, this may not be realistic because of two reasons: (1) too high order of the adaptive filter causes too high complexity; (2) too high order of the adaptive filter causes too slow adaptation convergence of the adaptive filter. That is why a common order of the adaptive filter is about few hundreds for a sampling rate of 8000 Hz.

The presence of disturbing sources such as desired speech, interference, or ambient noise may lead to instability and divergence of the adaptive filter. To prevent the instability, adaptation control mechanisms are required which adjust the stepsize of the adaptation algorithm to the present acoustic conditions. With a decrease in the power ratio of acoustic echoes and disturbance, a smaller stepsize becomes mandatory, which however increases the time until the adaptive filter have converged to efficient echo path models. As the above discussion about adaptive filtering for acoustic echo cancellation shows, the convergence time of the adaptive filter is a crucial factor in acoustic echo cancellation and limits the performance of AECs in realistic acoustic environments. With the aim of reducing the convergence time while assuring robustness against instabilities and divergence even during double talk, various adaptation algorithms have been studied in public literatures and articles for realizations in the time domain and or in the frequency domain.

Even with fast converging adaptation algorithms, there are typically residual echoes present at the output of the AEC. Furthermore, it is desirable to combine the echo cancellation with noise reduction. Therefore, post echo and noise reduction is often cascaded with the AEC to suppress the residual echoes and noise at the AEC output. These methods are typically based on spectral subtraction or Wiener filtering so that estimates of the noise spectrum and of the spectrum of the acoustic echoes at the AEC output are required. These are often difficult to obtain in a single-microphone system for time-varying noise spectra and frequently changing echo paths.

Figure 6:
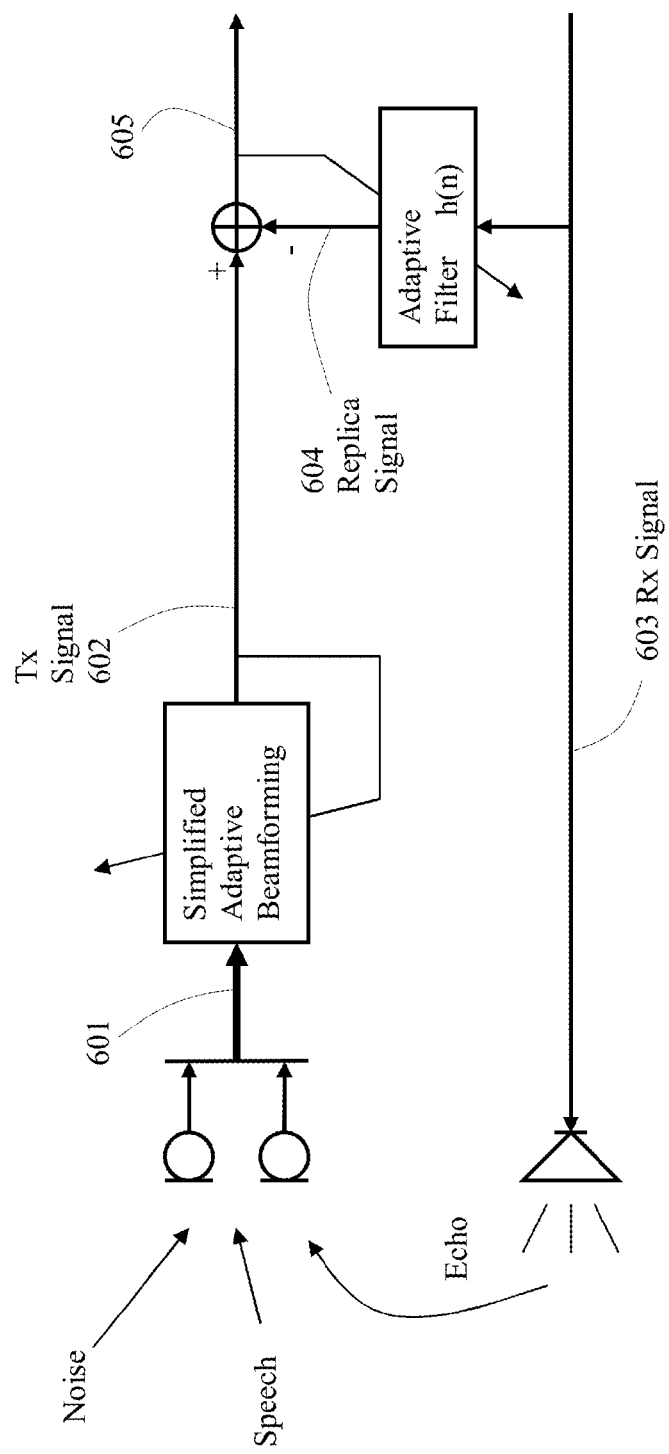
FIG. 6 illustrates an traditional AEC system.

FIG. 6 shows a traditional basic structure of AEC with a simplified beamforming system. To limit the computational complexity, 'beamforming first' system is adopted. The microphone array signals 601 are processed first by the simplified adaptive beamformer to get a single noise-reduced Tx signal 602; Rx signal 603 is employed as an excitation signal for the adaptive filter to produce an echo replica signal 604; the echo-suppressed signal 605 is obtained by subtracting the echo replica signal 604 from the Tx signal 602.

Figure 7:
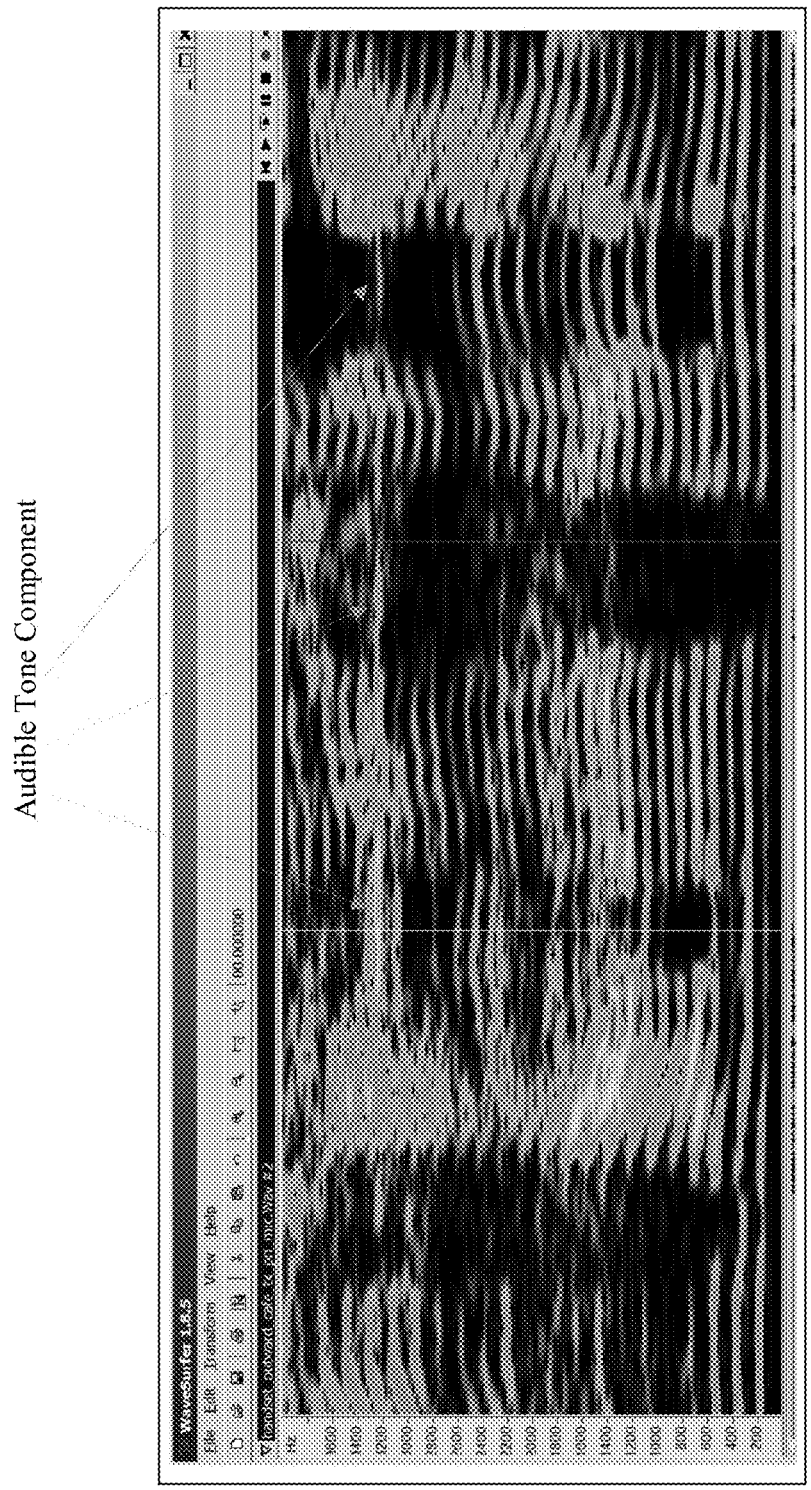
FIG. 7 illustrates an example spectrogram of speech signal with undesired tone component signals.

Suppose speech signal is desired. Undesired tone component signal may exist in the input signals 601. The undesired tone component signal usually comes from a noisy environment; it occasionally could be a part of acoustic echoes. FIG. 7 shows an example spectrogram of speech signal with undesirable tone component. The spectrum of tone component is often sharp and stable. The combined system of the adaptive beamformer with the AEC in FIG. 6 can reduce the undesirable tone component signal but often leaves a significant leakage into the signal 605. A post tone suppression processing is needed to significantly reduce the undesirable tone component.

Figure 8:
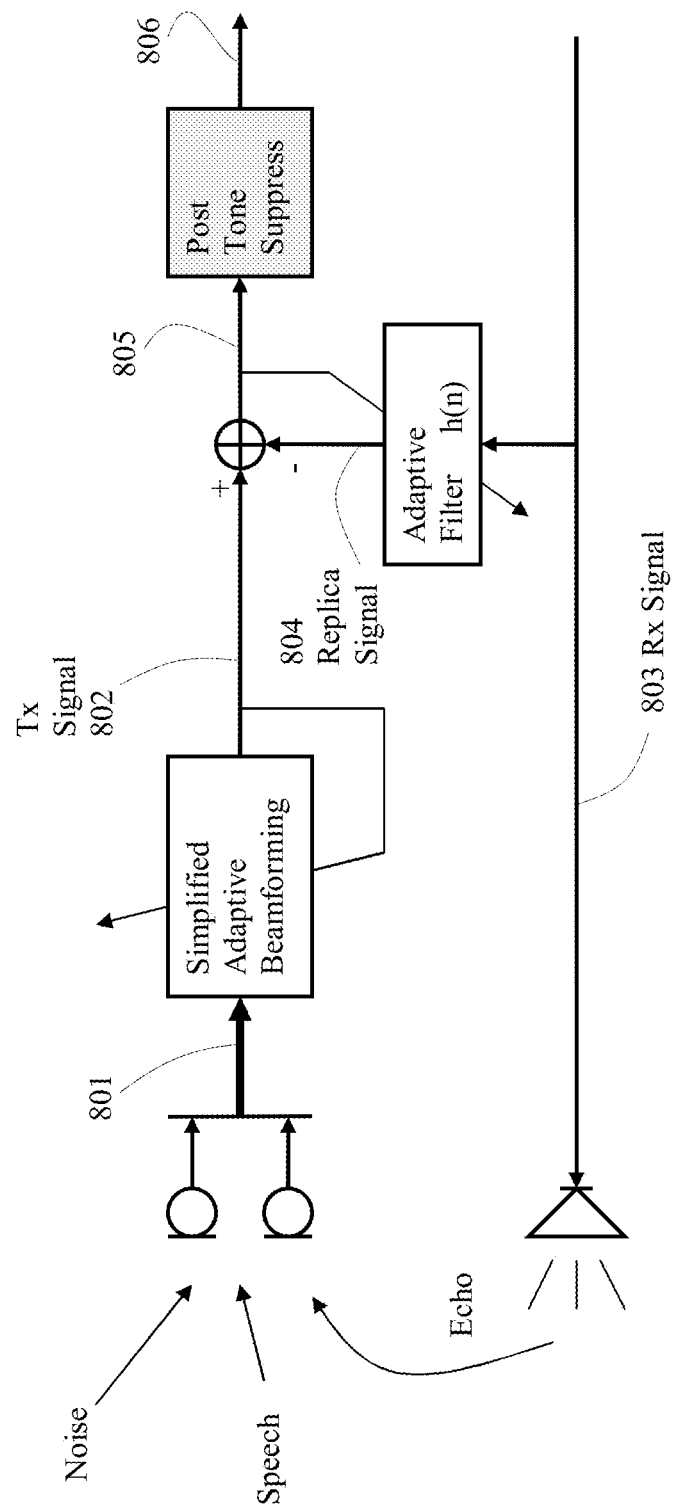
FIG. 8 illustrates a location of post tone suppression block.

FIG. 8 shows the similar structure as FIG. 6 except a block of Post-Tone-Suppress is added to remove or significantly reduce the undesirable tone component in the final output signal 806. To limit the computational complexity, 'beamforming first' system is also adopted. The microphone array signals 801 are processed first by the simplified adaptive beamformer to get a single noise-reduced Tx signal 802; Rx signal 803 is employed as an excitation signal for the adaptive filter to produce an echo replica signal 804; the echo-suppressed signal 805 is obtained by subtracting the echo replica signal 804 from the Tx signal 802.

Figure 9:
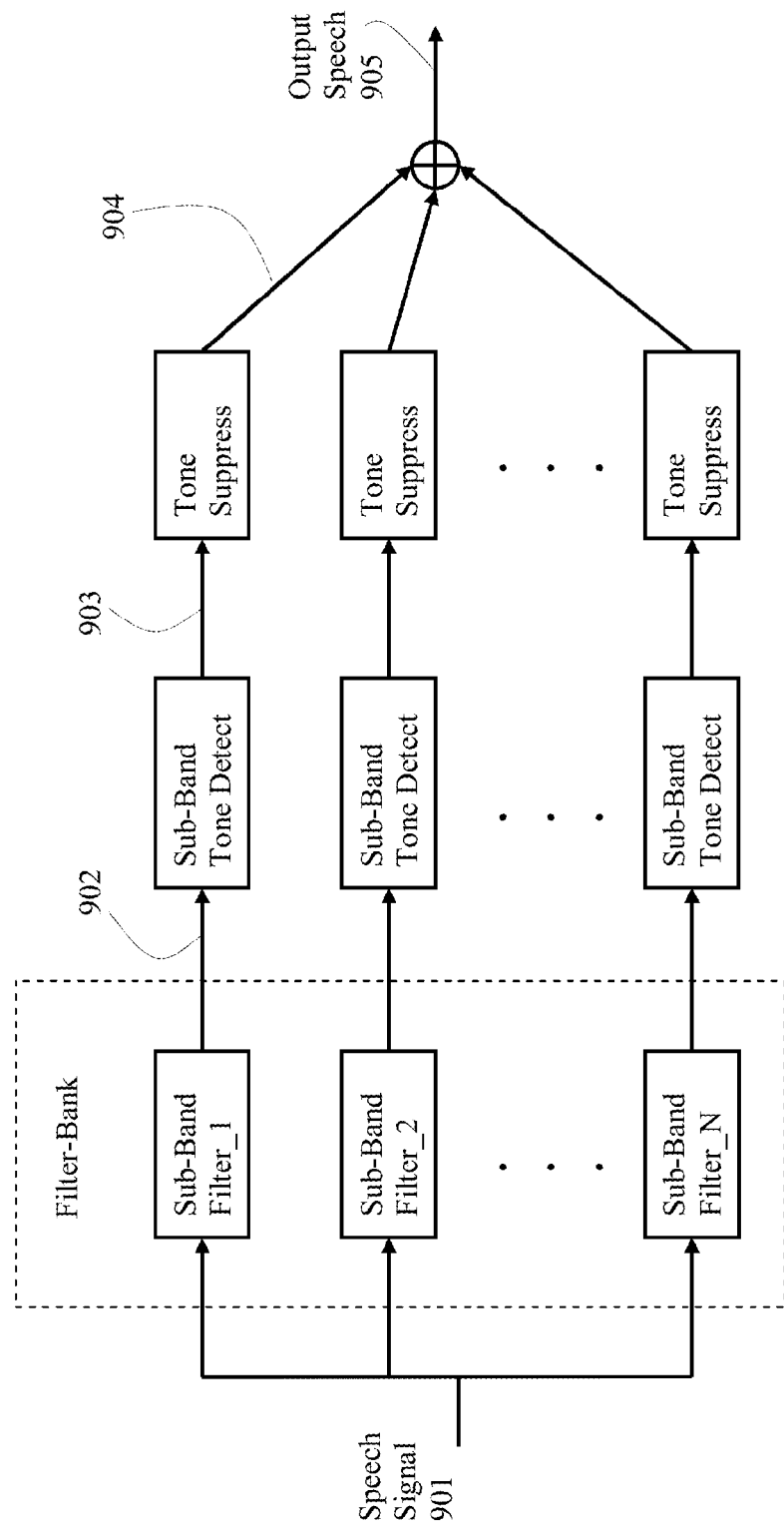
FIG. 9 illustrates a diagram of post tone suppress basic principle.

FIG. 9 shows the basic principle of the Post-Tone-Suppress. The input signal 901 is decomposed into a bank of sub-band component signals by passing through a filter bank. Possible tone existing in each component signal 902 (in each channel) is detected with a detection algorithm; a detected indication 903 of tone is employed to control an energy reduction gain so that the tone component is removed or significantly reduced in the output component signal 904. All the output component signals are added together to get back the final output speech signal 905.

Figure 10:
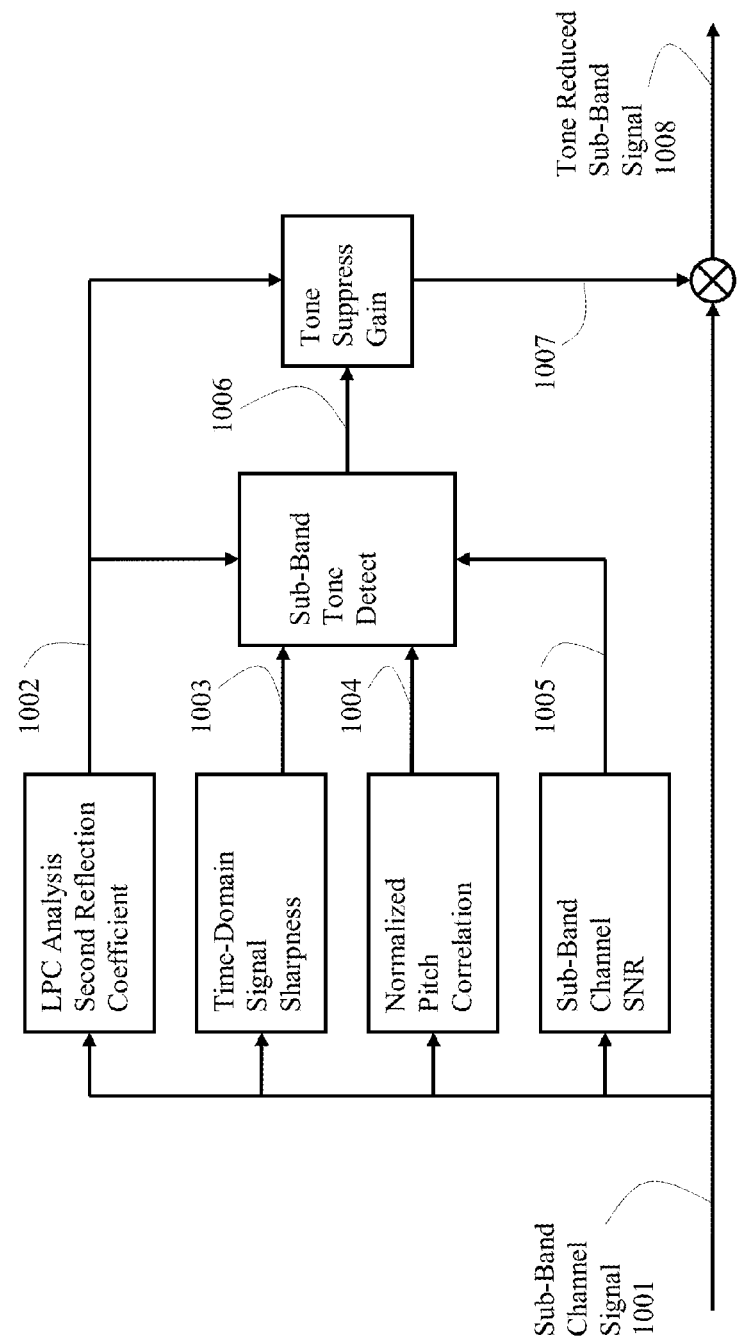
FIG. 10 illustrates a diagram of post sub-band channel tone reduction.

The algorithm principle of tone detection and tone reduction for different sub-band channels is basically the same although some details such as detection thresholds may differ. FIG. 10 shows the basic principle of the post tone suppression for one sub-band channel. Four major parameters are used to detect the tone component. One important parameter is second reflection coefficient 1002 obtained by performing LPC analysis on the input component channel signal 1001; a well known LPC analysis is called Levinson-Durbin approach. Another important parameter is named as time-domain signal sharpness 1003; the detailed definition of the time-domain signal sharpness will be explained later. The third parameter is a normalized pitch correlation 1004 of the component channel signal. The fourth parameter is SNR 1005 in the component channel signal. The four major parameters are used to detect possible tone; the detected indication 1006 is employed to produce an energy reduction gain 1007. A tone reduced component channel signal 1008 is obtained by scaling the input component channel signal 1001 with the energy reduction gain 1007. When the second reflection coefficient from the LPC analysis is close to 1, it shows a sharp spectrum may exist in the sub-band component signal; usually the second reflection coefficient is not close to 1 for normal speech signal. The time domain sharpness parameter is defined as an average value divided by a maximum value wherein the average value and the maximum value are calculated on a frame of the sub-band component signal. If tone signal exists, the time domain sharpness parameter is relatively large; for speech signal, the time domain sharpness parameter is relatively small because glottal pulses exist in human voiced speech. The normalized pitch correlation is calculated using pre-detected pitch lag; at this pitch lag, the normalized pitch correlation is maximized for voiced speech; however, the normalized pitch correlation is not maximized for tone component so that it may be relatively small. The disturbing tone components often exist in a noisy environment; so, SNR value as a supporting parameter sometimes can help the tone detection.

The following is a detailed example of detecting tone component. Some symbols are first defined:

RC2_ch: the second reflection coefficient obtained from LPC analysis on a component channel signal; often, Levinson-Durbin approach is used to perform the LPC analysis;

RC2_ch_sm: the smoothed RC2_ch;

Sharp_ch: the time domain sharpness parameter defined as an average value divided by a maximum value wherein the average value and the maximum value are calculated on a frame of sub-band component channel signal in time domain;

Sharp_ch_sm: the smoothed Sharp_ch;

Sharp_frm: the time domain sharpness parameter defined as an average value divided by a maximum value wherein the average value and the maximum value are calculated on a frame of speech signal in time domain;

Rp_ch: the normalized pitch correlation calculated on a frame of sub-band component channel signal in time domain;

Rp_ch_sm: the smoothed Rp_ch;

Rp_frm: the normalized pitch correlation calculated on a frame of speech signal in time domain;

Rp_frm_sm: the smoothed Rp_frm;

SNR_frm: SNR in dB calculated on a frame of speech signal in time domain;

SNR_lf_frm: SNR in dB calculated on a frame of low frequency speech signal in time domain;

TONE_THRD_ch: sub-band channel dependent constant threshold;

Tone_flag=1 means that tone component is detected; otherwise not detected;

Gain_tone: 0=<Gain_tone<=1, the energy reduction gain of sub-band component channel signal when tone is detected;

GAIN_TONE_MIN: minimum tone reduction gain.

In more detail, the time domain sharpness parameter of the channel signal is defined as an average value divided by a maximum value wherein the average value and the maximum value are calculated on a frame of sub-band component channel signal in time domain:

$$\text{Sharp\_ch} = \frac{\sum_{n=0}^{L-1} |S_{ch}(n)|}{L \cdot \text{Max}\{|S_{ch}(n)|, n = 0, 1, \ldots, L-1\}} \quad (1)$$

In (1), $S_{ch}(n)$ is a signal of one sub-band component channel, and L is the fame length.

The normalized pitch correlation calculated on a frame of sub-band component channel signal in time domain is $$\text{Rp\_ch} = \frac{\sum_n S_{ch}(n) \cdot S_{ch}(n - \text{Pitch})}{\sqrt{\left[\sum_n S_{ch}(n)^2\right]\left[\sum_n S_{ch}(n - \text{Pitch})^2\right]}} \quad (2)$$

In (2), Pitch is estimated based on the full band signal (not the sub-band component channel signal).

The following is an example procedure of detecting tone component and determining a tone reduction gain for one sub-band component channel signal:

```
Initial :
    Tone_flag = 0;
    Gain_tone = 1;
Cond =    ( (Sharp_ch >0.45) OR (Sharp_ch_sm >0.45) ) AND
          ( (Rp_ch_sm <0.5) OR (Sharp_frm >0.28) ) AND
          ( Rp_frm_sm<0.9) AND (SNR_frm<14)
          AND (SNR_lf_frm<16)
          AND (RC2_ch >TONE_THRD_ch − 0.06) ;
Tone_flag = (RC2_ch >TONE_THRD_ch) AND (Cond =1) ;
If (Cond= 1)
{
    If (Tone_flag = 1)
    {
        Gain_tone= GAIN_TONE_MIN;
    }
    Else
    {
        Gain_tone= (TONE_THRD_ch − RC2_ch ) * 6;
        Gain_tone=   MIN{ MAX{ Gain_tone ,
        GAIN_TONE_MIN} , 1 };
    }
}
```

Figure 11:
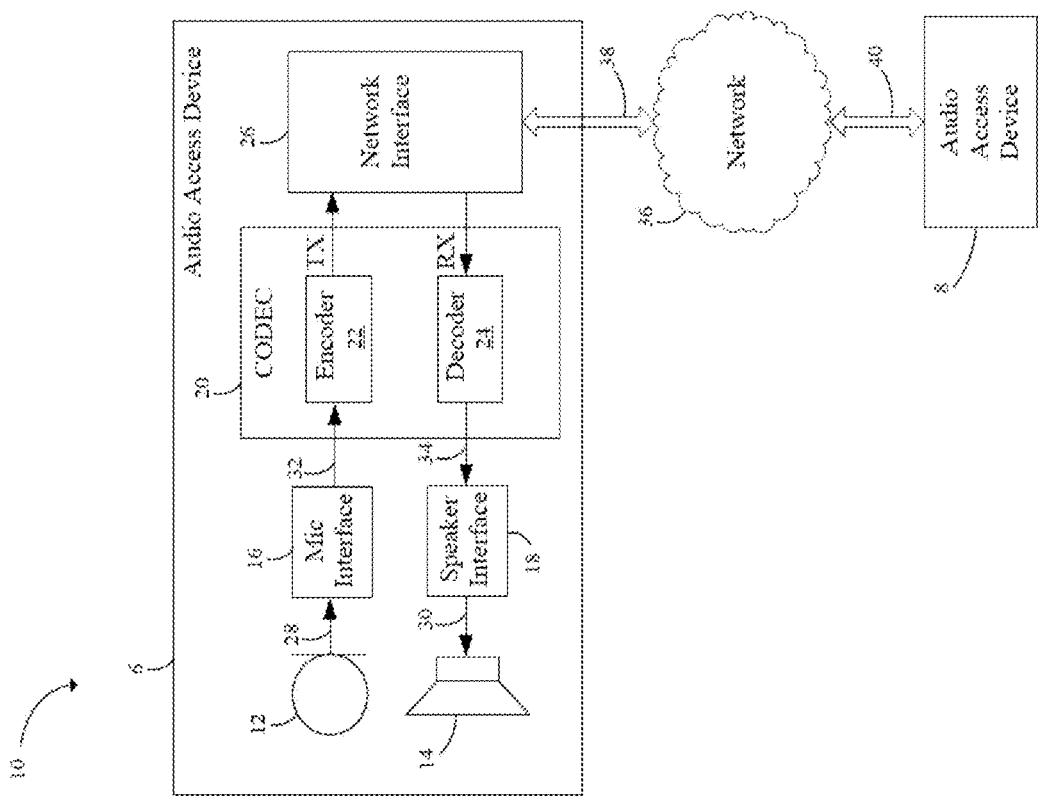
FIG. 11 illustrates a communication system according to an embodiment of the present invention.

FIG. 11 illustrates a communication system 10 according to an embodiment of the present invention. Communication system 10 has audio access devices 7 and 8 coupled to a network 36 via communication links 38 and 40. In one embodiment, audio access device 7 and 8 are voice over internet protocol (VOIP) devices and network 36 is a wide area network (WAN), public switched telephone network (PTSN) and/or the internet. In another embodiment, communication links 38 and 40 are wireline and/or wireless broadband connections. In an alternative embodiment, audio access devices 7 and 8 are cellular or mobile telephones, links 38 and 40 are wireless mobile telephone channels and network 36 represents a mobile telephone network.

The audio access device 7 uses a microphone 12 to convert sound, such as music or a person's voice into an analog audio input signal 28. A microphone interface 16 converts the analog audio input signal 28 into a digital audio signal 33 for input into an encoder 22 of a CODEC 20. The encoder 22 can include a speech enhancement block which reduces noise/interferences in the input signal from the microphone(s). The encoder 22 produces encoded audio signal TX for transmission to a network 26 via a network interface 26 according to embodiments of the present invention. A decoder 24 within the CODEC 20 receives encoded audio signal RX from the network 36 via network interface 26, and converts encoded audio signal RX into a digital audio signal 34. The speaker interface 18 converts the digital audio signal 34 into the audio signal 30 suitable for driving the loudspeaker 14.

In embodiments of the present invention, where audio access device 7 is a VOIP device, some or all of the components within audio access device 7 are implemented within a handset. In some embodiments, however, microphone 12 and loudspeaker 14 are separate units, and microphone interface 16, speaker interface 18, CODEC 20 and network interface 26 are implemented within a personal computer. CODEC 20 can be implemented in either software running on a computer or a dedicated processor, or by dedicated hardware, for example, on an application specific integrated circuit (ASIC). Microphone interface 16 is implemented by an analog-to-digital (A/D) converter, as well as other interface circuitry located within the handset and/or within the computer. Likewise, speaker interface 18 is implemented by a digital-to-analog converter and other interface circuitry located within the handset and/or within the computer. In further embodiments, audio access device 7 can be implemented and partitioned in other ways known in the art.

In embodiments of the present invention where audio access device 7 is a cellular or mobile telephone, the elements within audio access device 7 are implemented within a cellular handset. CODEC 20 is implemented by software running on a processor within the handset or by dedicated hardware. In further embodiments of the present invention, audio access device may be implemented in other devices such as peer-to-peer wireline and wireless digital communication systems, such as intercoms, and radio handsets. In applications such as consumer audio devices, audio access device may contain a CODEC with only encoder 22 or decoder 24, for example, in a digital microphone system or music playback device. In other embodiments of the present invention, CODEC 20 can be used without microphone 12 and speaker 14, for example, in cellular base stations that access the PTSN.

The speech processing for reducing noise/interference described in various embodiments of the present invention may be implemented in the encoder 22 or the decoder 24, for example. The speech processing for reducing noise/interference may be implemented in hardware or software in various embodiments. For example, the encoder 22 or the decoder 24 may be part of a digital signal processing (DSP) chip.

Figure 12:
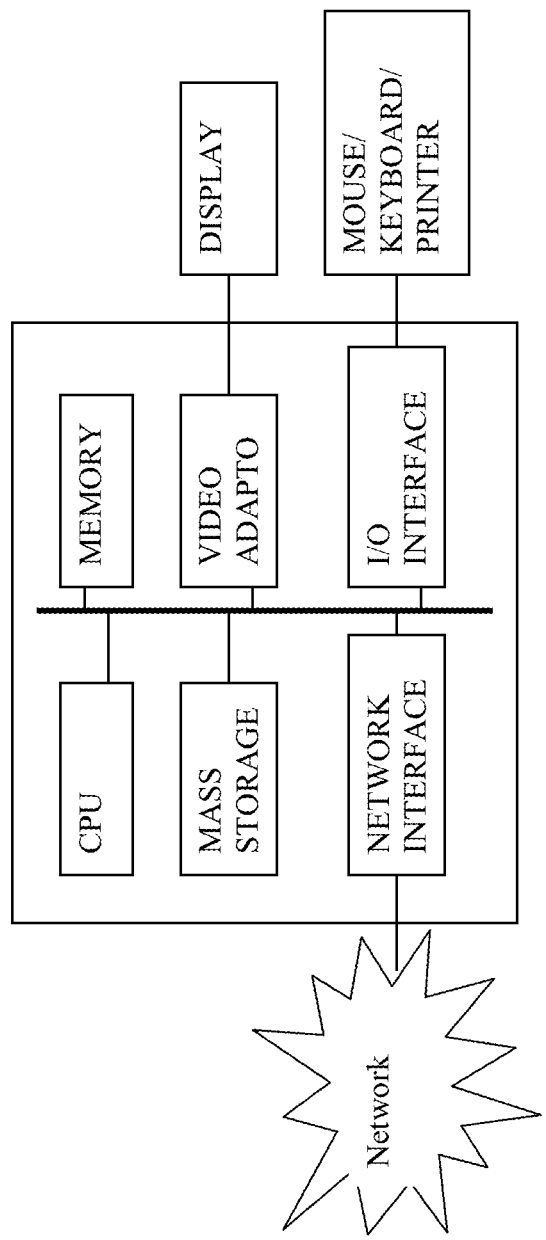
FIG. 12 illustrates a block diagram of a processing system that may be used for implementing the devices and methods disclosed herein.

FIG. 12 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, various embodiments described above may be combined with each other.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reducing disturbing tone signals from acoustic echoes or background noises in speech/audio signal enhancement processing, the method comprising:
   decomposing a full-band input microphone speech signal into plurality of sub-band component channel signals by using a filter-bank;
   detecting disturbing tone signal in each sub-band component channel signal wherein the parameters comprise at least one of a second reflection coefficient from LPC analysis, a time domain sharpness parameter, a normalized pitch correlation, and/or a SNR parameter;
   reducing the energy of the current sub-band component channel signal by multiplying a reduction gain if the disturbing tone signal is detected in the current sub-band component channel signal;
   summing back all the component channel signals to output a tone-reduced full band speech signal.

2. The method of claim 1, wherein reducing disturbing tone signals happens after acoustic echo cancellation and/or microphone array beamforming processing.

3. The method of claim 1, wherein the second reflection coefficient obtained from LPC analysis is calculated on the component channel signal with a Levinson-Durbin approach.

4. The method of claim 1, wherein the time domain sharpness parameter is defined as an average value divided by a maximum value wherein the average value and the maximum value are calculated on a frame of the component channel signal in time domain:

$$\text{Sharp\_ch} = \frac{\sum_{n=0}^{L-1} |S_{ch}(n)|}{L \cdot \text{Max}\{|S_{ch}(n)|, n = 0, 1, \ldots, L-1\}}$$

wherein $S_{ch}(n)$ is the component channel signal, and L is the fame length.

5. The method of claim 1, wherein the normalized pitch correlation is calculated on the component channel signal in time domain:

$$\text{Rp\_ch} = \frac{\sum_n S_{ch}(n) \cdot S_{ch}(n - \text{Pitch})}{\sqrt{\left[\sum_n S_{ch}(n)^2\right]\left[\sum_n S_{ch}(n - \text{Pitch})^2\right]}}$$

wherein Pitch is estimated based on the full band signal (not the component channel signal).

6. The method of claim 1, wherein the SNR is calculated in dB on a frame of the full band speech signal and/or the sub-band component channel signal.

7. The method of claim 1, wherein the reduction gain is larger than or equal to zero and smaller than or equal to one.

8. A speech signal processing apparatus comprising:
   a processor; and
   a computer readable storage medium storing programming for execution by the processor, the programming including instructions to:
   decompose a full-band input microphone speech signal into plurality of sub-band component channel signals by using a filter-bank;
   detect disturbing tone signal in each sub-band component channel signal wherein the parameters comprise at least one of a second reflection coefficient from LPC analysis, a time domain sharpness parameter, a normalized pitch correlation, and/or a SNR parameter;
   reduce the energy of the current sub-band component channel signal by multiplying a reduction gain if the disturbing tone signal is detected in the current sub-band component channel signal;
   sum back all the component channel signals to output a tone-reduced full band speech signal.

9. The speech signal processing apparatus of claim 8, wherein reducing disturbing tone signals happens after acoustic echo cancellation and/or microphone array beamforming processing.

10. The speech signal processing apparatus of claim 8, wherein the second reflection coefficient obtained from LPC analysis is calculated on the component channel signal with a Levinson-Durbin approach.

11. The speech signal processing apparatus of claim 8, wherein the time domain sharpness parameter is defined as an average value divided by a maximum value wherein the average value and the maximum value are calculated on a frame of the component channel signal in time domain:

$$\text{Sharp\_ch} = \frac{\sum_{n=0}^{L-1} |S_{ch}(n)|}{L \cdot \text{Max}\{|S_{ch}(n)|, n = 0, 1, \ldots, L-1\}}$$

wherein $S_{ch}(n)$ is the component channel signal, and L is the fame length.

12. The speech signal processing apparatus of claim 8, wherein the normalized pitch correlation is calculated on the component channel signal in time domain:

$$\text{Rp\_ch} = \frac{\sum_n S_{ch}(n) \cdot S_{ch}(n - \text{Pitch})}{\sqrt{\left[\sum_n S_{ch}(n)^2\right]\left[\sum_n S_{ch}(n - \text{Pitch})^2\right]}}$$

wherein Pitch is estimated based on the full band signal (not the component channel signal).

13. The speech signal processing apparatus of claim 8, wherein the SNR is calculated in dB on a frame of the full band speech signal and/or the sub-band component channel signal.

14. The speech signal processing apparatus of claim 8, wherein the reduction gain is larger than or equal to zero and smaller than or equal to one.

* * * * *